June 9, 1936.   R. PRICKETT   2,043,810
METALWORKING MACHINE
Filed June 2, 1934   2 Sheets-Sheet 1

INVENTOR.
RUSSELL PRICKETT
BY
Clark + Ott
ATTORNEYS.

June 9, 1936.  R. PRICKETT  2,043,810
METALWORKING MACHINE
Filed June 2, 1934   2 Sheets-Sheet 2

INVENTOR.
RUSSELL PRICKETT
BY Clark & Ott
ATTORNEYS.

Patented June 9, 1936

2,043,810

UNITED STATES PATENT OFFICE 2,043,810

METALWORKING MACHINE

Russell Prickett, Princeton, N. J.

Application June 2, 1934, Serial No. 728,638

6 Claims. (Cl. 90—13.4)

This invention has general relation to metal working machines and refers more particularly to a machine for turning out parts or elements which are machined with such accuracy and precision as to insure exact duplication thereof.

The invention broadly comprehends an improved machine of the indicated character and for the purpose specified in which the rough casting or blank to be machined is supported for rotation on an axis parallel to the axis of a fixed driven rotary cutter and in which the blank and its mounting are mounted for bodily movement towards and away from the cutter by means of a pattern or cam secured to and rotated with the blank and its support, and the pattern face of which cam is urged into contact with an abutment element.

The invention further resides in the provision of a machine of this nature in which the rough casting or blank to be machined, the driving spindle or equivalent support for rotating the same and the pattern or cam are in effect integral and rotate in unison during the machining operation and in which said blank is moved towards and away from a cutting tool mounted for rotation on a fixed axis parallel to the axis of rotation of the blank, the driving spindle and pattern, and in which a pattern abutment element or roller is arranged on a fixed axis disposed in axial alignment with the axis of the cutting tool.

The invention further embodies a machine of the type set forth in which the axes of rotation of the blank, the driving spindle, the pattern, the cutting tool and the pattern abutment element are preferably disposed vertically and in which the bodily movement of the blank, its support or driving spindle and the pattern, are guided in an arcuate path preferably by swingable means fulcrumed on a fixed vertical axis which is parallel to the axes of rotation of the several elements referred to.

The invention further contemplates a machine of the indicated character which is comparatively simple and not unduly complicated in its construction and mode of operation, which may be economically produced and which is highly efficient for its intended purpose.

With the above enumerated and other objects in view, reference is now made to the following specification and accompanying drawings, in which there has been set forth by way of example, a single and preferred embodiment of the invention, while the appended claims cover variations and modifications which fall within the scope of the invention.

Figures 1, 2:
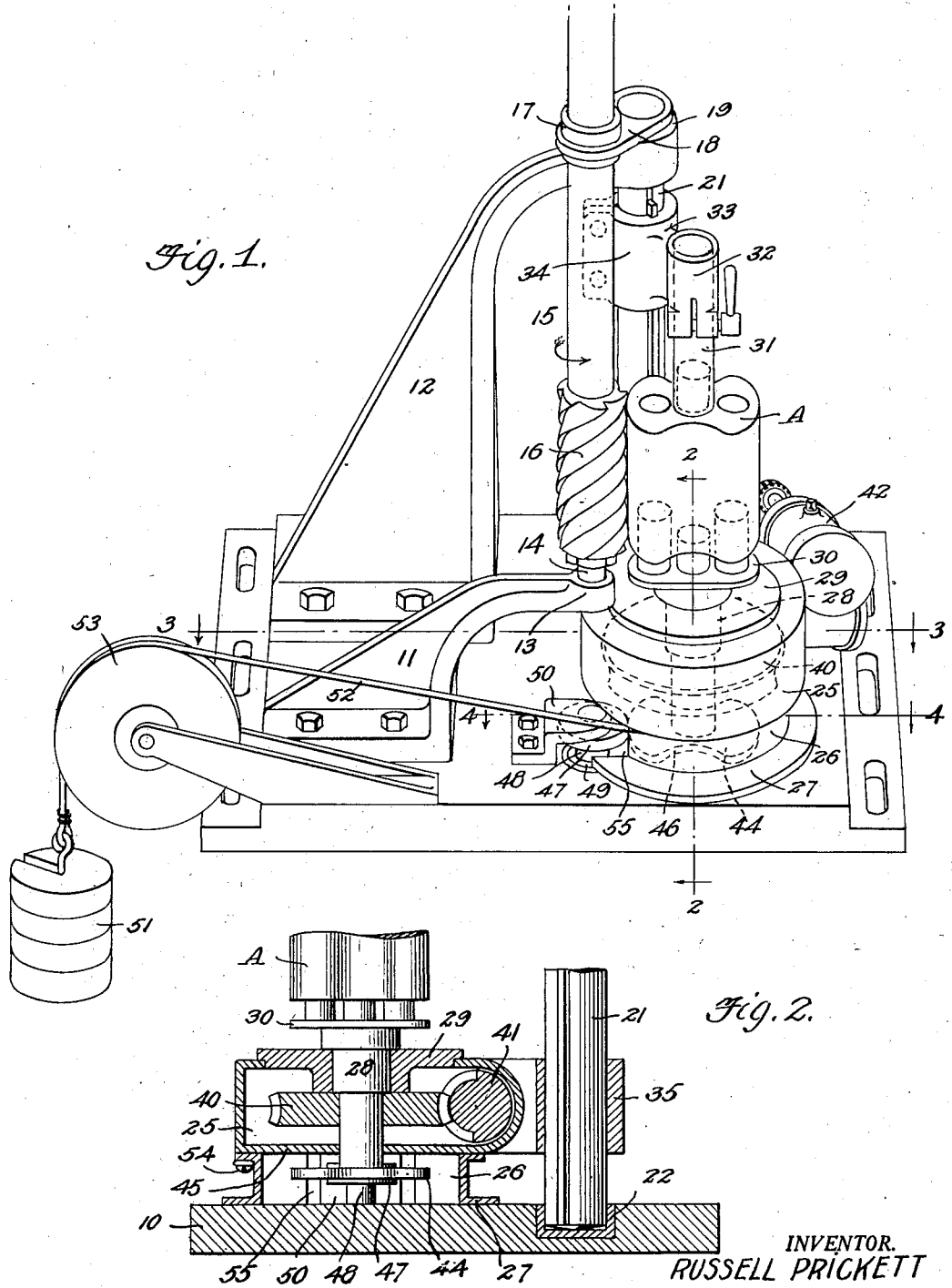
Fig. 1 is a perspective view of a machine illustrating the work in place.
Fig. 2 is a fragmentary vertical sectional view taken approximately on a plane indicated by the line 2—2 of Fig. 1.
Figure 3:
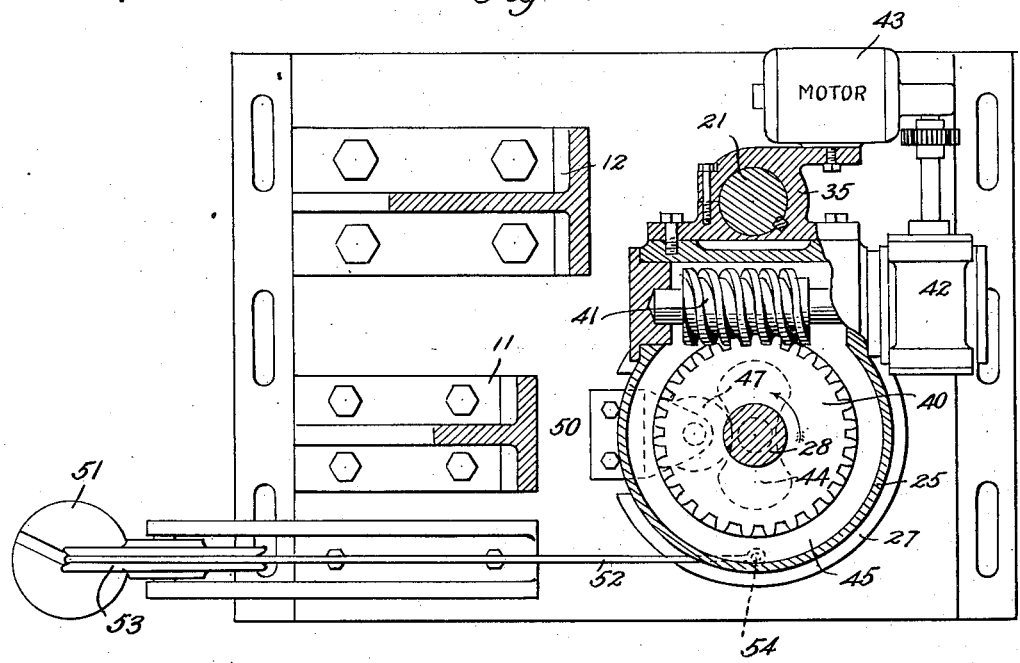
Fig. 3 is a sectional plan view thereof taken approximately on a plane indicated by the line 3—3 in Fig. 1.

Referring to the drawings by characters of reference, 10 designates the base or bed of the machine, to the upper surface of which is secured a pair of upstanding brackets 11 and 12, the former having a step bearing 13 which supports, for rotation, the lower end 14 of the shaft 15 of a cutting or milling tool 16. The shaft 15 extends upwardly through an upper bearing 17 and is driven by any suitable means at a relatively high rate of speed in a counter clockwise direction in plan, as indicated by the arrow. The bearing 17 is formed in a bracket 18 which is secured to a bearing 19 at the upper end of the bracket 12. A vertical rock shaft 21 is journaled in the bearing 19 and extends downwardly therefrom and is journaled at its lower end in the bed or base 10 as at 22.

Figure 4:
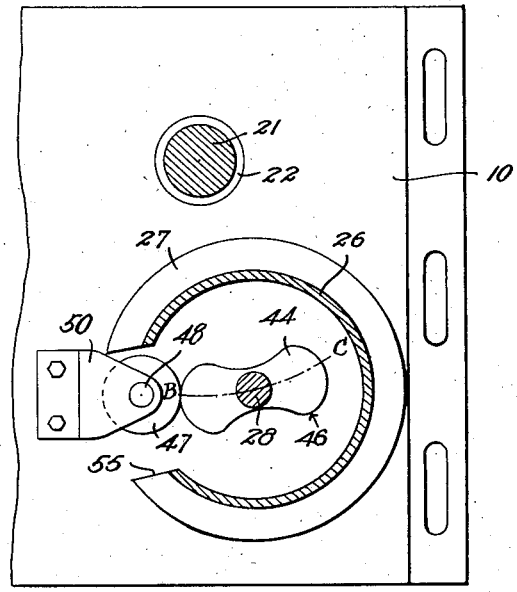
Fig. 4 is a similar view taken on a lower plane indicated by the line 4—4 in Fig. 1 and showing the pattern or cam disposed in a relatively different position.

In order to support and rotate the work against the cutting face of the cutter or milling tool 16, a casing member 25 is provided which includes a hollow lower portion 26 having an open flanged lower end 27 which is designed to slide over the upper surface of the bed or base 10. The casing 25 has journaled therein a vertical spindle 28 which extends upwardly from the closed upper end 29 of the casing and has secured thereto a driving dog 30 which serves in effect as a head stock for mounting and rotating the work on a vertical axis coextensive with the axis of the vertical spindle 28. The upper end of the work or blank A is supported for rotation by a tubular member 31 which is secured in a clamping sleeve 32 carried by a radial arm 33 and which is formed on a clamping sleeve 34 splined to the rock shaft 21. The casing 25 has secured to one side thereof, a bracket 35 which is formed with a vertical bore 36 and which is clamped about the rock shaft 21 and splined thereto for rocking movement of the casing therewith, constituting the vertical axis of the rock shaft 21 as a fulcrum, whereby, through the medium of the arm 33 and the bracket 35, the casing and the parts carried thereby are guided in an arcuate path indicated by the line B—C in Fig. 4 of the drawings.

Rotation is imparted to the driving spindle 28 in any desired manner and preferably from a separate source of power from that which drives the cutter or milling tool 16. As shown, the driving spindle 28 is driven through the medium of a worm wheel 40 which is keyed to the driving spindle 28 and is located within the body of the casing 25. The worm wheel is driven by a worm 41 which is in turn driven, through the medium of interposed reduction gearing in a gear box 42, by a motor 43 supported on the bracket 35.

In order to effect bodily movement of the work supporting means towards and away from the cutter or milling tool 16 to machine the surface thereof and to impart thereto the desired shape, a face cam or pattern 44 is secured to the lower end of the driving spindle 28, which protrudes below the bottom wall 45 of the casing body, for turning movement with the spindle. The face or periphery 46 of the cam or pattern 44 is adapted to engage with an abutment preferably in the form of a roller 47 which is mounted to turn on a fixed vertical axis disposed in alignment with the axis of rotation of the cutter or milling tool 16.

As shown, the abutment roller is mounted on a shaft 48, journaled in a bearing 49 in the bed or base 10, and in a bearing bracket 50. The casing 25 and the parts supported thereby, together with the work or blank A are normally swung on the axis of the rock shaft as a fulcrum in a clockwise direction in plan, by means of a weight 51 attached to a cable 52 which is trained around a guide sheave 53 and is anchored as at 54 to the casing 25 at a point diametrically opposite the fulcrum point defined by the axis of the rock shaft 21. The lower portion 26 of the casing is cut away or notched as at 55 to permit the cam or pattern 44 to engage with the abutment roller 47. The weight serves to move and maintain the periphery of the work or blank A in engagement with the cutting periphery of the cutter or milling tool 16, while the periphery or face 46 of the pattern or cam 44 serves as a guide or gage for controlling the amount of material machined from the periphery of the work in addition to imparting thereto a contour in duplication of that of the periphery or face 46 of said cam or pattern. The relatively slow rotation of the work or blank A, coupled with the rapid rotation of the cutter or milling tool 16, insures a precision and accurate machining of the work to conform with the pattern or cam.

In the present disclosure, the cam or pattern is shown for machining the faces of impellers for rotary type pumps, but obviously cams or patterns of varying shapes or contours may be employed in connection with the machine for the purpose of machining other types of articles by substituting the same for the cam 45 as shown. It is also apparent that with one shape of pattern, any number of articles may be machined in exact duplication of each other.

What is claimed is:

1. A machine of the character set forth including a cutter mounted for rotation on a fixed axis, means adapted to support the work for rotation thereof on an axis parallel to the cutter, a pattern cam secured to said means to rotate therewith, an abutment roller mounted to rotate on a fixed axis coinciding with the axis of the cutter and against which roller the periphery of the cam is urged, and fulcrumed means having its axis parallel to the axes of rotation of the blank and its supporting means and by virtue of which said blank and its support are swingingly guided for bodily movements in accordance with the periphery of the pattern cam.

2. In a machine of the character set forth, a cutter mounted for rotation on a fixed vertically disposed axis, means adapted to support the work for rotation thereof on a vertical axis parallel to the cutter, a pattern cam secured to said means to rotate therewith, an abutment roller mounted to rotate on a fixed axis coinciding with the axis of the cutter and against which the periphery of the cam is urged, said supporting means including a vertical rock shaft having radially disposed supports and vertically spaced bearings having aligned vertical axes carried by said radial supports.

3. In a machine of the character set forth, a cutter mounted for rotation on a fixed vertically disposed axis, means adapted to support the work for rotation thereof on a vertical axis parallel to the cutter, a pattern cam secured to said means to rotate therewith, an abutment roller mounted to rotate on a fixed axis coinciding with the axis of the cutter and against which the periphery of the cam is urged, said supporting means including a vertical rock shaft having radially disposed supports and vertically spaced bearings having aligned vertical axes carried by said radial supports, and means carried by said bearings for respectively supporting and imparting rotation to the work.

4. In a machine of the character set forth, a cutter mounted for rotation on a fixed axis, means adapted to support the work for rotation thereof on a vertical axis parallel to the cutter, a pattern cam secured to said means to rotate therewith, an abutment roller mounted to rotate on a fixed axis, coinciding with the axis of the cutter and against which the periphery of the cam is urged, said supporting means including a vertical rock shaft having radially disposed supports and vertically spaced bearings having aligned vertical axes carried by said radial supports, and means carried by said bearings for respectively supporting and imparting rotation to the work.

5. A machine of the character set forth including a base, a driven cutter mounted for rotation on a fixed vertically disposed axis with reference to said base, a vertical rock shaft supported by the base, a member slidable over the upper surface of said base and connected with the rock shaft for swingable guided movement, a driving spindle journaled in said member on a vertical axis, means carried by the member for imparting rotation to said driving spindle, means on the upper end of the driving spindle for coupling the work thereto for turning movement therewith, means secured to and projecting radially from the rock shaft for supporting the upper end of the work for rotation, a pattern cam secured to the lower end of the driving spindle and means carried by the base with which said pattern cam is engaged for controlling the movement of said member, the work and other parts supported thereby in a direction towards and away from the cutter.

6. In a machine of the character set forth, a cutter mounted for rotation on a fixed axis, means adapted to support the work for rotation thereof on a vertical axis parallel to the cutter, a pattern cam secured to said means to rotate therewith, an abutment roller corresponding in diameter to the diameter of the cutter and mounted to rotate on a fixed axis coinciding with the axis of the cutter and against which the periphery of the cam is urged, said supporting means including a vertical rock shaft having radially disposed supports and vertically spaced bearings having aligned vertical axes carried by said radial supports.

RUSSELL PRICKETT.